(12) United States Patent
Disse et al.

(10) Patent No.: US 8,196,999 B2
(45) Date of Patent: Jun. 12, 2012

(54) METHOD OF MOUNTING A ROOF ELEMENT AS WELL AS A MOUNTING ARRANGEMENT OF A ROOF ELEMENT

(75) Inventors: Thomas Disse, Magstadt (DE); Stefan Hauser, Altensteig (DE); Heiko Schramm, Stuttgart (DE); Johann Seefried, Eutingen (DE); Holger Seibert, Magstadt (DE)

(73) Assignee: Daimler AG, Stuttgart (DE)

( * ) Notice: Subject to any disclaimer, the term of this patent is extended or adjusted under 35 U.S.C. 154(b) by 70 days.

(21) Appl. No.: 12/847,864

(22) Filed: Jul. 30, 2010

(65) Prior Publication Data

US 2011/0031782 A1    Feb. 10, 2011

(30) Foreign Application Priority Data

Aug. 1, 2009  (DE) .......................... 10 2009 035 728
Oct. 2, 2009  (DE) .......................... 10 2009 048 168

(51) Int. Cl.
*B60R 99/00* (2009.01)
(52) U.S. Cl. ........................................................ 296/210
(58) Field of Classification Search .................. 296/210, 296/218, 216.06, 224
See application file for complete search history.

(56) References Cited

U.S. PATENT DOCUMENTS

| 4,221,426 | A  | * | 9/1980 | Wardill .......................... 296/178 |
| 4,257,632 | A  | * | 3/1981 | DeStepheno ................... 292/263 |
| 4,287,654 | A  | * | 9/1981 | Chrysler ....................... 29/401.1 |
| 4,729,596 | A  | * | 3/1988 | Fujihara et al. ................ 296/218 |
| 4,819,985 | A  | * | 4/1989 | Williams ....................... 296/218 |
| 5,769,486 | A  | * | 6/1998 | Novoa et al. ................... 296/210 |
| 6,431,549 | B1 | * | 8/2002 | Hill et al. ....................... 277/316 |
| 6,592,177 | B1 | * | 7/2003 | Mathew ......................... 296/210 |
| 6,865,795 | B2 | * | 3/2005 | Hernandez et al. .............. 29/469 |
| 6,988,767 | B2 | * | 1/2006 | Schlachter et al. ............ 296/218 |
| 7,021,704 | B2 | * | 4/2006 | Ortega Martinez et al. .. 296/214 |
| 7,055,896 | B2 | * | 6/2006 | Ozkok et al. ................... 296/210 |
| 7,128,365 | B2 | * | 10/2006 | Kiesewetter et al. .......... 296/191 |
| 7,334,309 | B2 | * | 2/2008 | Huijer .............................. 29/458 |

FOREIGN PATENT DOCUMENTS

DE    10 2008 005 286 A1    6/2009

* cited by examiner

*Primary Examiner* — Lori Lyjak
(74) *Attorney, Agent, or Firm* — Crowell & Moring LLP

(57) ABSTRACT

The invention relates to a method and apparatus for mounting a roof element on a vehicle body, particularly of a passenger car. Relative to a roof frame element, the roof element is moved from a prefixing position into a final mounting position. In the prefixing position, the roof element is held by a prefixing pairing of at least one roof-element-side and at least one roof-frame-element-side prefixing element.

9 Claims, 3 Drawing Sheets

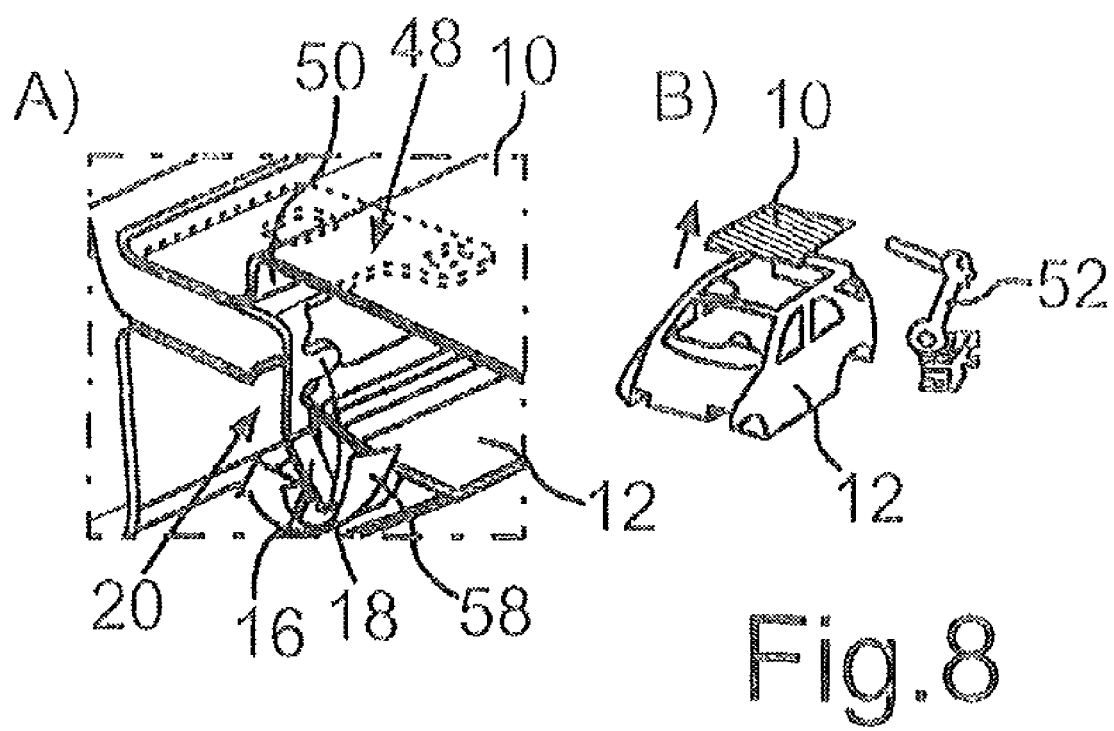
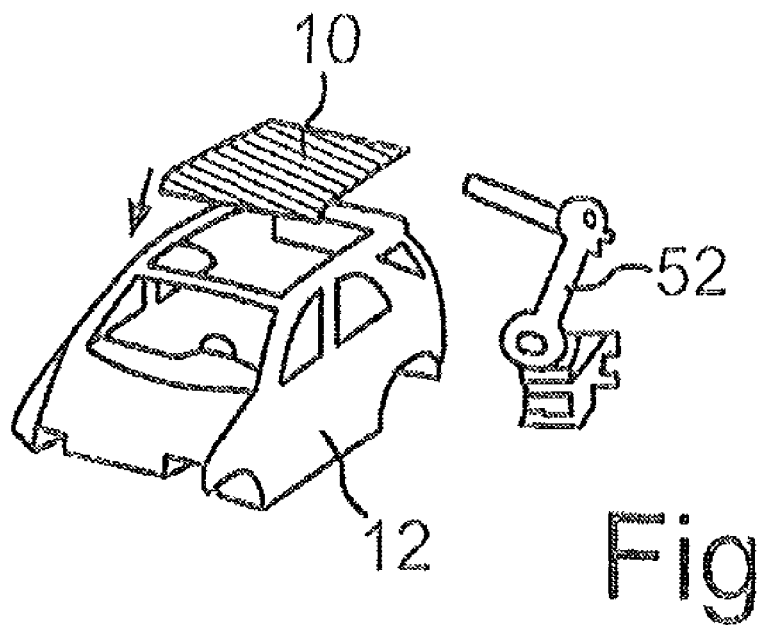

METHOD OF MOUNTING A ROOF ELEMENT AS WELL AS A MOUNTING ARRANGEMENT OF A ROOF ELEMENT

BACKGROUND AND SUMMARY OF THE INVENTION

This application claims the priority of German patent documents 10 2009 035 728.9, filed Aug. 1, 2009 and 10 2009 048 168.0, filed Oct. 1, 2009, the disclosures of which are expressly incorporated by reference herein.

The invention relates to a mounting arrangement and a method for mounting a roof element, for example, on a motor vehicle.

In a previously known method of mounting a roof element, particularly a roof joined for mounting, the roof is fixedly connected in advance, using additional resources, for example, in the form of tensioning and fixing devices, which results in increased mounting expenditures and therefore in higher costs. As a result, the cost of the above-mentioned roof element itself is also increased.

In particular, the joining of vehicle body components made of different metals or metal alloys leads to the problem of contact corrosion. If the materials of the joined components are situated sufficiently far away from one another in the electrochemical series, an electron drift and a formation of oxide or hydroxide will occur particularly with the admission of moisture. Such component connections therefore must be galvanically insulated from one another at high expenditures in order to prevent this electrochemical process.

When linking a roof panel part to a side wall of a motor vehicle, the components are usually connected with one another by corresponding flange areas, and are subsequently clip-painted. If a roof panel made of aluminum is connected in this manner with a side wall made of steel, it must be ensured that the connection areas are wetted in the dipping paint bath, so as to ensure galvanic insulation by the paint.

A further problem when dip-painting such hybrid vehicle bodies lies in the different thermal expansion coefficients of aluminum and steel. Since, during the dip painting, a heat treatment step in an oven follows the dipping bath, roof panels made of aluminum cannot be firmly connected with the vehicle body frame made of steel while they pass through this process because otherwise there would be tensions and distortions. However, in order to ensure a uniform paint color, the roof panel must be painted together with the residual vehicle body. It is therefore necessary to create a temporary fixed connection between the roof and the vehicle body which permits joint painting of the respective components while ensuring that the connection areas are wetted with paint, and at the same time permits the roof and the remaining vehicle body to expand independently of one another during the heat treatment.

Such a method of connecting components of the motor vehicle is disclosed, for example, in German Patent Document DE 10 2008 005 286 A1, in which a temporary glued connection is created between the components which can be released again after the painting, and is replaced by the final gluing-together. However, such methods have the disadvantage that removal of the adhesive of the temporary glued connection requires high expenditures and it time-consuming.

It is therefore one object of the present invention to provide a simplified method of mounting a roof element of the initially mentioned type, as well as a simplified mounting arrangement for a roof element.

This and other objects and advantages are achieved by the method and apparatus according to the invention for mounting a roof element on the body of a motor vehicle (particularly a passenger car) in which, relative to a roof frame element, the roof element is moved from a "prefixing" position into a final mounting position. In its prefixing position, the roof element is prefixed relative to the roof frame element by a prefixing pairing of at least one roof-element-side prefixing element and at least one roof-frame-element-side prefixing element. This means therefore that the roof element can be prefixed with respect to the roof frame without any additional and separate components or resources, for example, in the form of tensioning and fixing devices. This simplifies the mounting of the roof element, which results in a reduction of the mounting costs. The method according to the invention makes it possible, for example, to prefix a roof joined for mounting on a roof frame for a surface pass.

The roof-element-side, or the roof-frame-element-side prefixing element, or both, are advantageously constructed in one piece with theroof element or with the roof frame element, which reduces the number of parts, and in turn, further reduces costs for the mounting.

In an advantageous embodiment of the invention, in the prefixing position, the roof-element-side prefixing element is caused to engage at least in regions in the roof-frame-element-side prefixing element, by bending over a T-shaped lug, which is the shape of the roof-element-side prefixing element constructed in one piece with the roof element or fastened to the latter. The lug engages in a groove provided for this purpose, which groove represents the roof-frame-side prefixing element and is provided or made available, for example, laterally on the roof frame element. Thus, the roof element is prefixed relative to the roof frame element in both the longitudinal and vertical directions of the roof frame, as well as and in the transverse direction.

Displacement of the roof element relative to the roof frame element in the direction of an open side of the roof-frame-element-side prefixing element, or of the groove, is precluded because a similar or identical prefixing pairing is provided on an opposite side of the roof element and of the roof frame element respectively. Such prefixing pairing prevents a displacing of the roof element with respect to the roof frame element in the direction of an open side of the roof-frame-element-side prefixing element on the side which, in turn, is opposite.

In an advantageous embodiment of the invention, it is provided that, in the prefixing condition, the roof element is spaced from the roof frame element by a lug (particularly, a round lug) resting on the roof element. This spacing permits a coating of an assembly consisting of the roof element and the roof frame element, for example, by a cathodic dip painting, during which, as a result of this spacing, the dipping bath can penetrate into all regions of the roof element and of the roof frame element. Thus, no contact of the roof element and of the roof frame element would prevent a coating in these regions. When the roof element is moved from the prefixing position into the final mounting position, it is advantageously provided that the spacing of the roof element from the roof frame element is eliminated, for example, such that, when the final mounting position or a construction position of the roof element has been reached, the above-mentioned lug dips away into a corresponding recess or passage opening or the like on the part of the roof frame element.

It should be noted at this point that an arrangement of the respective prefixing element, or prefixing elements, that is opposite to what was mentioned above would also be possible. In every respect, the method according to the invention achieves a saving of additional resources, which lowers the costs for the mounting and makes it possible to save mounting time.

In addition, the invention relates to a mounting arrangement of a roof element on a vehicle body of a motor vehicle, particularly a passenger car, in which the roof element can be moved relative to the roof frame element, from a prefixing position into a final mounting position. In its prefixing position, the roof element can be prefixed by a prefixing pairing of at least one roof-element-side and at least one roof-frame-element-side prefixing element. Advantageous further developments of the method should be considered to be advantageous further developments of the mounting arrangement and vice-versa. By the mounting arrangement according to the invention, all advantages of reducing the cost and the time when mounting the roof element on the roof frame element can be implemented which are described in connection with the method according to the invention.

Other objects, advantages and novel features of the present invention will become apparent from the following detailed description of the invention when considered in conjunction with the accompanying drawings.

BRIEF DESCRIPTION OF THE DRAWINGS

FIGS. 6 to 9 are representations of two motor vehicle components during various process steps of a variant of the method according to the invention.

DETAILED DESCRIPTION OF THE DRAWINGS

Figure 1:
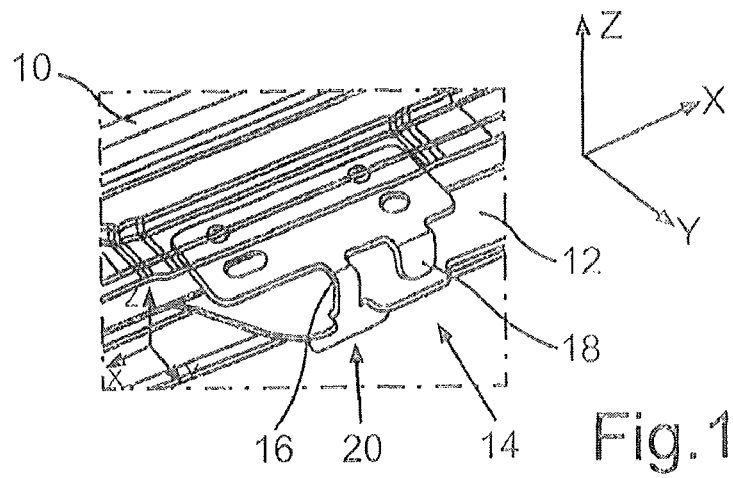
FIG. 1 shows a mounting arrangement of a roof element on a vehicle body of a passenger car, the roof element being in a prefixing position relative to a roof frame element, in which prefixing position, the roof element is prefixed by a prefixing pairing of a roof-element-side prefixing element and of a roof-frame-element side prefixing element.

FIG. 1 illustrates a roof element in the form of a roof 10 joined for mounting, which is prefixed on the roof frame 12 for a surface pass. This prefixing is implemented by a prefixing pairing 14 which includes a first roof-element-side prefixing element 16 and a second roof-element-side prefixing element 18, which are connected with the roof 10.

As illustrated in FIG. 1, the roof-element-side prefixing element 16 comprises a T-shaped lug which is bent over and engages in a corresponding roof-frame-element-side prefixing element 20, which, in this case, is constructed as a groove. The roof-element-side prefixing element 18, on the other hand, is constructed as a bent-over round lug which rests on the roof frame 12 and thereby spaces the roof 10 away from the roof frame 12. Such a mounting arrangement can be used, for example, in the case of a vehicle body of a passenger car.

In the prefixing position illustrated in FIG. 1, the roof 10 is thus displaced relative to the roof frame 12 in both the longitudinal and vertical direction of the vehicle (that is, in the X-direction and in the Z-direction), and is fixed in the above-mentioned directions as well as in the transverse direction of the vehicle (the Y-direction). In this case, the prefixing pairing illustrated in FIG. 1 is constructed in the transverse direction of the vehicle on one side of the roof frame 12 and of the roof 10. Movement of the roof 10 with respect to the roof frame 12 in the direction of an opening of the roof-frame-element-side prefixing element 20 (a groove in this case) can be prevented, for example by providing corresponding prefixing pairing on the opposite side of the fixing pairing 14, (that is, on the opposite side of the roof frame 12 and of the roof 10, respectively).

At this point, it should be noted that the respective vehicle direction correlates with a respective roof frame direction and roof direction respectively.

The spacing of the roof 10 with respect to the roof frame 12 is necessary in order to provide a sufficiently large gap between the roof 10 and the roof frame 12 for a flow of a dipping bath of cathodic dipping paint for the coating of the above-mentioned components.

Figure 2:
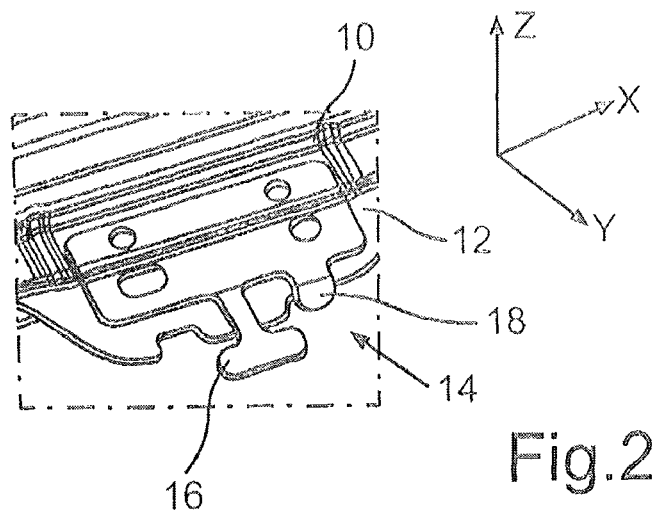
FIG. 2 is a view of the mounting arrangement according to FIG. 1, with the roof element in its final mounting position.

FIG. 2 illustrates the roof 10 in its final mounting position, in which the roof 10 is displaced in the X-direction relative to the roof frame 12. As illustrated, the roof-element-side prefixing element 16 is now bent straight and no longer engages in the roof-frame-element-side prefixing element 20. In addition, the spacing of the roof 10 relative to the roof frame 12 is eliminated, such that the additional roof-element-side prefixing element 18 will now no longer rest on the roof frame 12 but has slid over a corresponding edge and has dipped down, as it were. In this final mounting position, a final mounting (and thereby a final connection of the roof 10) can take place on the roof frame 12.

Figure 3:
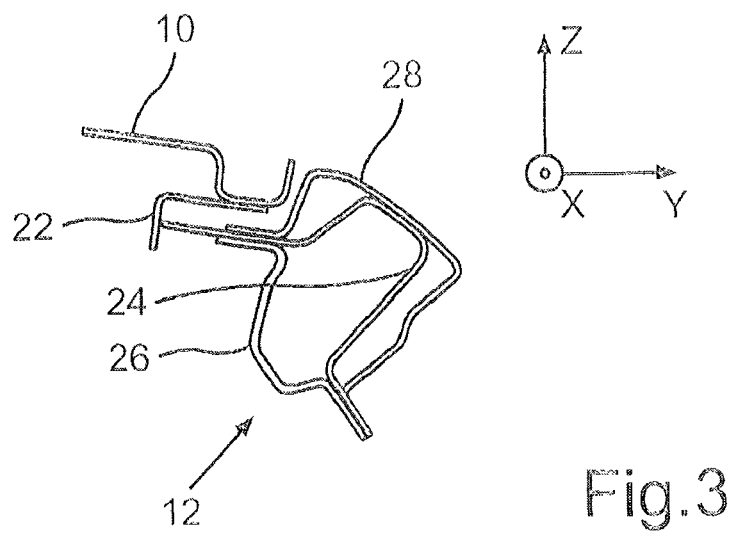
FIG. 3 is a cross-sectional view of a mounting arrangement of a roof element on a vehicle body of a motor vehicle.

FIG. 3 illustrates the roof 10 mounted on the roof frame 12 by way of a holder 22. In this case, the roof frame 12 comprises an outer lateral roof frame element 24 and an inner lateral roof frame element 26. In addition the cross-sectional view of FIG. 3 shows a side wall covering 28 which is also connected with the roof frame 12.

As mentioned above, the prefixing pairing 14 is constructed in the transverse direction of the vehicle laterally at the roof and at the roof frame 12 respectively. It is easily possible to provide a corresponding construction of the prefixing pairing 14 also in another region or on another side (for example, on sides in the longitudinal vehicle direction of the roof 10 and of the roof frame 12 respectively).

Figure 4:
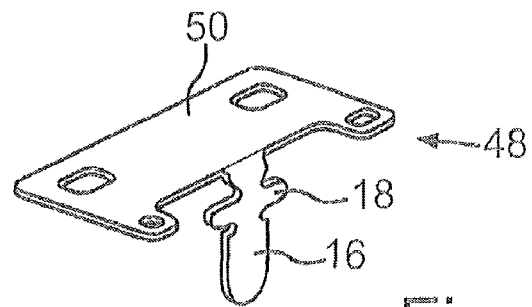
FIG. 4 shows an embodiment of a prefixing element according to the invention.
Figure 5:
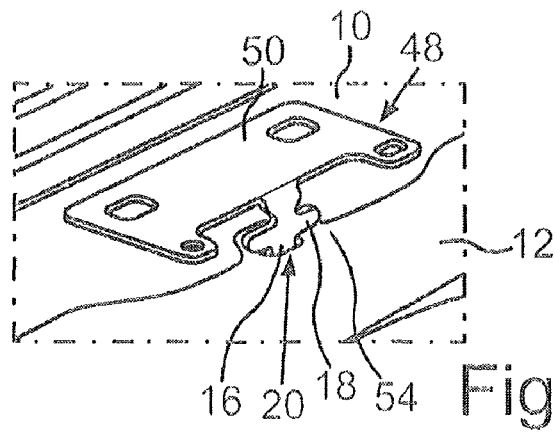
FIG. 5 is a view of a temporary connection of two components by means of the prefixing element according to FIG. 4.

FIG. 4 illustrates a further embodiment of two roof-element-side prefixing elements 16, 18, which, in this example, are formed by an intermediate element 48 that is used for temporary connection of two components 10, 12 of a motor vehicle. The component 10 is constructed as a roof made of an aluminum alloy; the component 12 is a steel body of the motor vehicle. A temporary connection of the two components 10, 12 by the intermediate element 48 is established during a dip painting process in order to be able to paint the two components 10, 12 simultaneously. During such a dip painting operation, the components have to be wetted as completely as possible, which is not the case when they are fixed directly in their respective final mounting position. This is ensured by the intermediate element 48. A heat treatment process takes place simultaneously with the dip painting. Because of the different materials of the roof 10 and of the vehicle body 12, these materials expand to different degrees during the heat treatment. Distortions would occur if there were a fixed connection. This is avoided by the intermediate element 48.

The intermediate element 48 has a supporting surface 50 by way of which it is temporarily connected with the roof 10. A tongue 16 projects perpendicularly to the supporting surface 48, which tongue 16 forms the first roof-element-side prefixing element 16. This tongue 16 has a spacer 18 which extends transversely with respect to the main dimensional direction of the tongue 16 and forms the second roof-element-side prefixing element 18.

Figure 6:
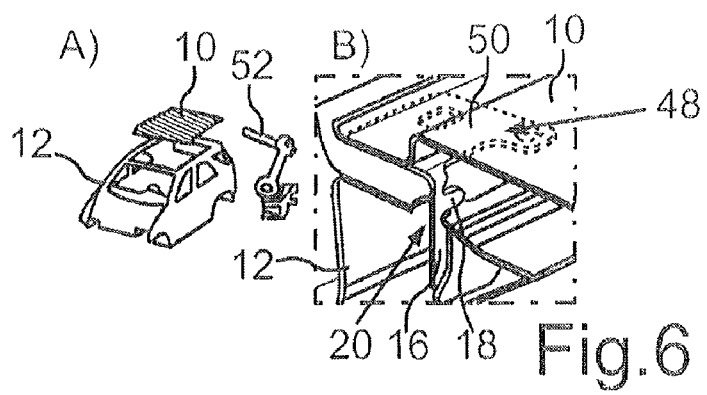

For establishing the temporary connection between the roof 10 and the vehicle body 12, the roof 10 is first connected with the supporting surface 50 of the intermediate element 48. As illustrated in FIG. 6, the thus prepared roof 10 is now placed on the vehicle body by means of a robot 52, the tongue 16 being inserted into a passage opening 20 of the vehicle body which forms the roof-frame-element-side prefixing element 20. In the process, the tongue 16 comes to rest on a surface 54 of the vehicle body 12, so that a distance is ensured between the roof 10 and the vehicle body 12.

Figure 7:
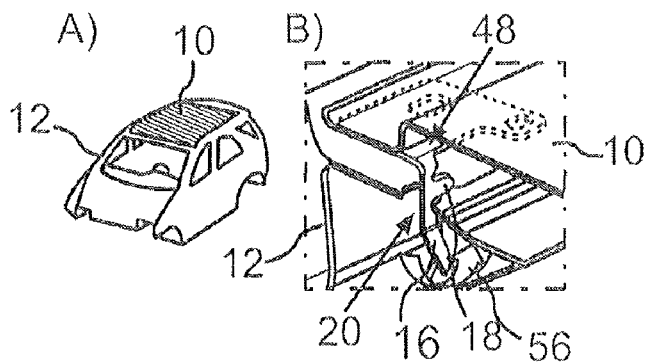

As illustrated in FIG. 7B, after roof 10 is placed in this intermediate mounting position, the tongue 16 is then bent over in the direction of the arrow 56. The roof 10 and the vehicle body 12 are now indirectly connected by way of the intermediate element 48 without contacting one another. The dip painting of the roof 10 and of the vehicle body 12 can take place in this condition.

After the dip painting and the heat treatment connected therewith, as illustrated in FIG. 8A, the roof 10 is removed again from the vehicle body 12 by means of the robot 52. For this purpose, the tongue 16 first has to be bent back in the opposite direction, thus, in the direction of the arrow 58. The roof 10 can then be lifted off the vehicle body in the upward direction, in which case the tongue 16, which is now again situated perpendicular to the supporting surface 54, can be pulled out through the passage opening 20.

After removal of the roof 10 from the intermediate mounting position, the intermediate element 48 is detached from the roof 10, and, as illustrated in FIG. 9, the roof 10 is finally moved into its final mounting position by the robot 52. Bonded seams are applied to corresponding flanges of the vehicle body 12 and the roof, which bonded seams also comprise lining seams, so that, after the placing of the roof 10 onto the vehicle body 12 by the robot 52, the final glued connection between the roof 10 and the vehicle body 12 is established.

While the components 10, 12 to be connected up to now have been described as parts consisting of a metallic material, for example, the vehicle roof 10—in addition to the above-outlined embodiment as a component made of an aluminum alloy—may be any mounting roof, which has to be prefixed in the shell. In particular, the vehicle roof 10 can be further developed, for example, as a plastic or hybrid roof.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for mounting a roof element on a vehicle body, wherein:
   the roof element is moved from a prefixing position relative to a roof frame element, into a final mounting position; and
   in the prefixing position, the roof element is held by a prefixing pairing of at least one roof-element-side prefixing element and at least one roof-frame-element-side prefixing element, and
   wherein the at least one roof-element-side prefixing element:
      has a substantially T-shaped construction; and
      in the prefixing position, is caused to engage at least in regions with the at least one roof-frame-element-side prefixing element, which is constructed as a groove.

2. The method according to claim 1, wherein in the prefixing position, the at least one roof-element-side prefixing element is caused to engage at least in regions with the at least one roof-frame-element-side prefixing element.

3. The method according to claim 1, wherein, in the prefixing position, the at least one roof-element-side prefixing element is caused to engage by bending-over the at least one roof-frame-element-side prefixing element.

4. The method according to claim 1, wherein, in the prefixing position, the roof element is spaced away from the roof frame element by at least one additional roof-element-side prefixing element.

5. The method according to claim 4, wherein, in the prefixing position, the roof element is spaced away from the roof frame element by at least one lug that bears against the roof frame element.

6. The method according to claim 4, wherein spacing of the roof element from the roof frame element is eliminated by moving the roof element from the prefixing position into the final mounting position.

7. A mounting arrangement for mounting a roof element on the body of a motor vehicle, wherein:
   relative to a roof frame element a roof element is moveable from a prefixing position into a final mounting position; and
   in the prefixing position, the roof element is connectable to the roof frame element by a prefixing pairing of at least one roof-element-side prefixing element and at least one roof-frame-element-side prefixing element, and
   wherein the at least one roof-element-side prefixing element:
      has a substantially T-shaped construction; and
      in the prefixing position, is engaged at least in regions with the at least one roof-frame-element-side prefixing element, which is constructed as a groove.

8. A method of mounting a vehicle roof element to a vehicle roof frame element, said method comprising:
   initially mounting said vehicle roof element temporarily in a prefixing position relative to said vehicle roof frame element, said prefixing position being spaced apart from said vehicle roof frame element by a predetermined separation amount;
   performing a processing of said mounted vehicle roof element and said vehicle roof frame element collectively while they are held in said prefixing position;
   moving said vehicle roof element from said prefixing position into a final mounting position relative to said vehicle roof frame element; and
   joining said vehicle roof element and said vehicle roof frame element in said final position; wherein,
   in said prefixing position, said vehicle roof element and said vehicle roof frame element are held spaced apart by at least one roof element prefixing component which releasably engages with at least one roof frame element prefixing component, and
   at least one of said at least one roof element prefixing component and said at least one roof frame element prefixing component includes a lug that holds said vehicle roof element and said vehicle roof frame element in said spaced apart relationship.

9. The method according to claim 8, wherein said processing comprises applying a coating to the vehicle roof element and said vehicle roof frame element, including areas adjoining said predetermined separation amount.

* * * * *